(12) United States Patent
Schamal

(10) Patent No.: US 6,427,356 B1
(45) Date of Patent: Aug. 6, 2002

(54) MOUNTABLE CENTERING ELEMENT AND ARRANGEMENT FOR MEASURING, OR DETERMINING THE POSITION OF A HOLE OR A BOLT

(75) Inventor: Axel Schamal, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/397,734

(22) Filed: Sep. 17, 1999

(30) Foreign Application Priority Data

Sep. 17, 1998 (DE) .......................................... 198 42 630

(51) Int. Cl.[7] .............................................. G01B 5/25
(52) U.S. Cl. .............................. 33/613; 33/520; 33/644
(58) Field of Search ........................ 33/613, 520, 644, 33/645, DIG. 1, 600, 608, 574, 577

(56) References Cited

U.S. PATENT DOCUMENTS

| | | | |
|---|---|---|---|
| 1,032,831 A | * 7/1912 | Hodgson | 411/930 |
| 2,063,181 A | * 12/1936 | Miller | 411/167 |
| 2,419,134 A | * 4/1947 | Hall | 33/520 |
| 2,679,692 A | * 6/1954 | Fortner et al. | 33/613 |
| 3,026,621 A | * 3/1962 | Papps et al. | 33/520 |
| 4,539,753 A | * 9/1985 | Fitzpatrick | 33/613 |
| 4,907,929 A | * 3/1990 | Johnston, Jr. | 411/908 |
| 5,122,019 A | * 6/1992 | Unger | 411/107 |
| 5,179,788 A | * 1/1993 | Jadach | 33/613 |
| 5,272,927 A | 12/1993 | Carlen | |
| 5,678,703 A | * 10/1997 | Sawyer | 211/105.1 |
| 5,702,214 A | * 12/1997 | Duran | 411/5 |

FOREIGN PATENT DOCUMENTS

| | | | |
|---|---|---|---|
| DE | 733 370 | 3/1943 | |
| DE | 733370 | 3/1943 | |
| DE | 936895 | 12/1955 | |
| DE | 936 895 | 12/1955 | |
| DE | 9106101 | 10/1991 | |
| DE | G 91 06 101.6 | 10/1991 | |
| DE | 4337861 | 5/1994 | |
| GB | 728426 | * 4/1955 | 33/520 |
| GB | 798276 | * 7/1958 | 33/520 |
| JP | 01058530 | 3/1989 | |
| JP | 11190324 | 7/1999 | |

* cited by examiner

Primary Examiner—Christopher W. Fulton
(74) Attorney, Agent, or Firm—Crowell & Moring LLP

(57) ABSTRACT

Mountable element is provided for measuring, or determining the position of, a hole or bolt constructed on a component, particularly of a welded bolt or a threaded bolt. The element is placed on a first side of the component on a component surface surrounding the hole or the bolt. The mountable element has an internal thread which can be screwed together with a fixing screw, which can be introduced into the hole from a second side of the component, for fixing the mountable element on the component while clamping the component between the mountable element and the fixing screw. Alternatively, the mountable element, or a fixing bush arranged in the mountable element, is adapted to an outer diameter of a bolt constructed on the component.

18 Claims, 2 Drawing Sheets

MOUNTABLE CENTERING ELEMENT AND ARRANGEMENT FOR MEASURING, OR DETERMINING THE POSITION OF A HOLE OR A BOLT

BACKGROUND AND SUMMARY OF THE INVENTION

This application claims the priority of German Application No. 198 42 630.5, filed Sep. 17, 1999, the disclosure of which is expressly incorporated by reference herein.

The invention relates to a mountable centering element and an arrangement for measuring, or determining the position of, a hole or a bolt constructed on a component, particularly of a welded bolt or a threaded bolt, which can be placed on a first side of the component on a component surface surrounding the hole or the bolt.

In numerous technical applications, it is necessary to determine the exact positions or spacings of a number of holes and/or welded or threaded bolts constructed in the component in order to measure the component. For example, in the field of monitoring vehicle body shells as well as their subgroups, such as attached sheet metal parts or individual parts, by measuring techniques, such measurements must be carried out frequently. Because the holes or bolts or their centers, are not directly accessible, it is difficult to make such precise measurements without requiring high expenditures.

In addition, the measurements of holes often have tolerances so that it is expedient to determine the hole centers. The conventional measuring of welded or threaded bolts also have high measuring errors. A large number of individual measurements and reviews must be carried out in order to calculate a corresponding center by way of corresponding perpendicular and sectional calculations. When a measuring caliper is used on threaded screws, a problem occurs in that the measuring caliper, as a rule, does not arrive at the highest point of the thread pitch so that significant errors also occur here.

From German Patent Document DE-PS 936 895, an arrangement is known for measuring distances on an object. The arrangement is introduced into a hole of the object to be measured. The arrangement consists of two separate parts, specifically a shaft which fits into the hole of the object and a part which ends in a ball of a defined radius of curvature. This ball can be positioned such that it is used as a reference point with respect to the center of the hole. In this arrangement, it is a disadvantage that only a pin is introduced into the hole to be measured. The pin cannot be completely fixed inside the hole. This results in measuring errors during measuring.

From German Patent Document DE-PS 733 370, a device is known for measuring spacings of connection points, particularly points, such as ball centers, which cannot be measured directly. This device consists of a main scale with longitudinally adjustable slider bodies and measuring elements which can be displaced in the slider bodies transversely to the main scale. This relatively large device is unsuitable, for example, for measurements at inaccessible sites.

The German Design Patent G 91 06 101 discloses a precision measuring stick which, by inserting a spike into an opening, permits a measuring of the diameter of the opening. The precise determining of the position of the opening is not the object of the teaching described in this document.

It is an object of the present invention to provide an arrangement by which a precise and inexpensive measuring of, or determining the position of, holes or welded or threaded bolts of a component is permitted in a simple manner.

This object is achieved by a mountable element for measuring or determining the position of, a hole or bolt constructed on a component, particularly of a welded bolt or a threaded bolt, which can be placed on a first side of the component on a component surface surrounding the hole or the bolt. The mountable element has an internal thread, which can be screwed together with a fixing screw, which can be introduced into the hole from a second side of the component, for fixing the mountable element on the component while clamping the component between the mountable element and the fixing screw, or with the bolt or a fixing bush adapted to the outside diameter of the bolt.

According to the invention, a mountable element or one or more arrangements are provided by which the precise determination of the position of holes or recesses or welded or threaded bolts, for example, on a body of a motor vehicle, can be carried out in a simple manner. The mountable elements according to the invention can be used in a flexible manner for measuring holes as well as threaded bolts. Measurements at inaccessible sites, for example, the floor panel of a vehicle body, can be carried out without any problem. The mountable element according to the invention is distinguished by lower manufacturing costs as well as fast mountability and demountability. Adaptations to different thread pitches can be carried out in a simple manner by corresponding further developments of the internal-thread of the mountable element.

When an arrangement according to the invention is used for measuring or determining the position of a hole, the mountable element and a fixing screw are mounted on the hole, or inserted in the hole, from opposite sides of the hole and screwed to one another. As a result, a positionally precise clamping fixing of the arrangement or of the mountable element on the component can be achieved.

When an arrangement according to the invention is used for measuring or determining the position of a bolt on a component, a fixing bush, which corresponds to the outside diameter of the bolt, can be screwed into the internal thread of the mountable element. The mounting and demounting takes place by the fitting on and withdrawal of the arrangement from the bolt or bolts to be measured. In this case, it is particularly advantageous to provide a magnetic insert in the mountable element, which ensures a good tight fit around the bolt. The mountable element can have a knurled construction, which permits a particularly simple demounting of the mountable element. As the result of a flexible exchange of the fixing bushes of different diameters, different bolt diameters can be measured by means of a mountable element, whereby the mountable element assumes an adapter-like function. Exchanging the fixing bush can be carried out, for example, by means of a screwdriver. A hardening of the fixing bush was found to be particularly advantageous so that a wearing-off of the fixing bush diameter can be avoided, whereby a high durability is ensured.

Advantageous further developments of the invention are described herein.

According to a preferred embodiment of the mountable element according to the invention, this mountable element has an essentially hemispherical or partially spherical outer contour or shape. The measuring of such hemispherical or partially spherical elements was found to be particularly simple and inexpensive. For example, a bolt to be measured can deviate with respect to its position in all directions up to 5 mm from its desired position without an interruption of a CNC series measuring sequence during the measuring of the ball-like mountable element by means of collision. The process steps in the ball measuring CNC sequence are always the same. The ball element can always be mirrored during the programming if the positions of the bolts with respect to one another in the slope do not significantly deviate from one another. Particularly, during the measuring of such ball shapes, the good tight fit of the mountable element is advantageous. The roundness of the mountable element and the precise centering of the internal thread determine in a very exact manner the center of a bolt to be measured and thus provides the actual condition of the bolt on the pertaining component surface. It should be noted that the mountable element according to the invention may also have a cornered construction, particularly that of a hexagon or an octagon. Preferred materials for the mountable element are plastic materials, metals or other suitable materials. By using magnetic materials, for example, an adhesion of the mountable element on a component can also be ensured prior to being screwed to a bolt or a screw. Hemispherical shapes with diameters of from 15–35 mm can be used particularly advantageously in practice.

The mountable element expediently has a supporting ring on its underside. This ensures that the mountable element can lie closely on the component also in the presence of an uneven component surface in the proximity of the hole or bolt (for example, caused by welding spatters, burrs from punching or bolt bases). Such a supporting ring may, for example, have a ring thickness of 2 mm in the case of an inside ring diameter of 17 mm.

According to a preferred embodiment, the mountable element has a bevel on its lower edge. Such a bevel, which preferably has an angle of approximately 45°, ensures an injury-free screwing-on and unscrewing as well as a good handling of the mountable element according to the invention by a user.

According to another expedient embodiment, the internal thread is asymmetrically arranged with respect to the mountable element. By means of this measure, it is possible to measure holes or bolts at inaccessible edge areas or in the run-out of roundings of a component. In the case of a hemispherical or partially spherical outer contour of the mountable element, such an asymmetrical construction can be achieved, for example, by means of a one-sided or two-sided milling-off of the mountable element.

According to an advantageous embodiment of the mountable element according to the invention, the internal thread is constructed as a through-thread. As a result, it is possible to measure bolts or screws of any length by using the mountable element according to the invention.

The mountable element expediently has an insert, particularly a ring-shaped insert, made of a magnetic material. Particularly when the mountable element is used together with a fixing bush which can be slid onto a bolt, such an insert ensures a good tight fit on the bolt, whereby high measuring precision can be achieved.

According to a preferred embodiment of the arrangement for measuring, or determining the position of, a hole, the fixing screw has a conically tapering section. By means of such a conical section, a particularly secure and positionally precise fixing of the fixing screw can be achieved in a hole.

Other objects, advantages and novel features of the present invention will become apparent from the following detailed description of the invention when considered in conjunction with the accompanying drawings.

DETAILED DESCRIPTION OF THE DRAWINGS

Figure 1:
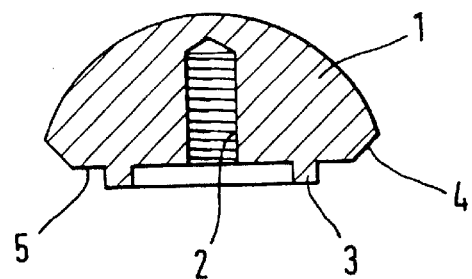
FIG. 1 is a lateral sectional view of a first preferred embodiment of the mountable element according to the invention.
Figure 1A:
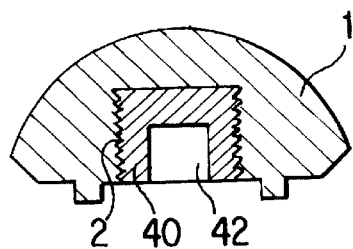
FIG. 1A illustrates an alternate embodiment of the mountable element according to FIG. 1.

The mountable element 1 illustrated in FIG. 1 has an essentially hemispherical contour. In the center inside the mountable element 1, a recess is provided which is constructed with an internal thread 2. The mountable element 1 also has a supporting ring 3 on its underside 5. By means of such a supporting ring 3, the mountable element 1 can be positioned perpendicularly on the component even in the presence of an uneven surface 10 (see FIG. 2, in which a welding spatter 10 is shown as an example). The lower edge area of the mountable element 1 is constructed with a bevel 4, which is used for the simple and secure handling of the mountable element. The bevel 4 preferably has an angle of 45° with respect to the underside 5 of the mountable element 1.

Figure 2:
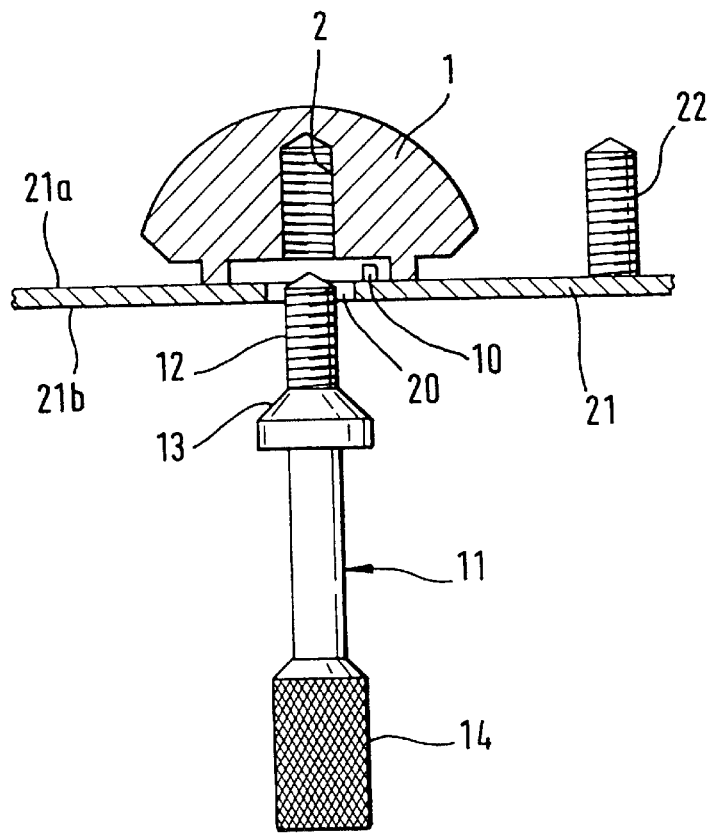
FIG. 2 is an exploded lateral sectional view of a preferred embodiment of the arrangement according to the invention for measuring a hole and determining the position of a hole.

By means of FIGS. 2 and 3, the use of the mountable element 1 will be explained with respect to an arrangement for measuring a hole and determining the position of a hole 20 in a component, particularly a vehicle body component of a motor vehicle. The mountable element can analogously be used for measuring a bolt 22 and determining the position of the bolt 22 provided on the component 21, as illustrated on the right in FIG. 2.

The mountable element 1 interacts with a threaded pin or a fixing screw 11. This fixing screw 11 is constructed with a thread 12 at its upper end, which thread 12 can be screwed to the internal thread 2. The thread 12 is adjoined by a conical section 13. The lower edge 14 of the fixing screw 11 has a knurled construction, whereby handling is facilitated.

The mountable element 1 and the fixing screw 11 are guided to the hole from opposite directions. The mountable element 1 is applied to a first side 21a of the component 21. In this case, the mountable element 1 can be placed onto the surface of the component 21 surrounding the whole 20. The fixing screw 11 is introduced from a second side 21b of the component 21 into the hole 20. Subsequently, the thread 12 and the internal thread 2 are screwed to one another while clamping in the component 21. The conical section 13 acts upon the underside of the hole 20 or of the component 21 and thus provides an optimal centering of the fixing screw 11 in the hole 20. After the components 1, 11 have been screwed to one another, a positionally precise fixing of the mountable element 1 with respect to the hole 20 is ensured. The measuring of the mountable element for determining the position of the hole 20 takes place in a manner known per se.

Figure 3:
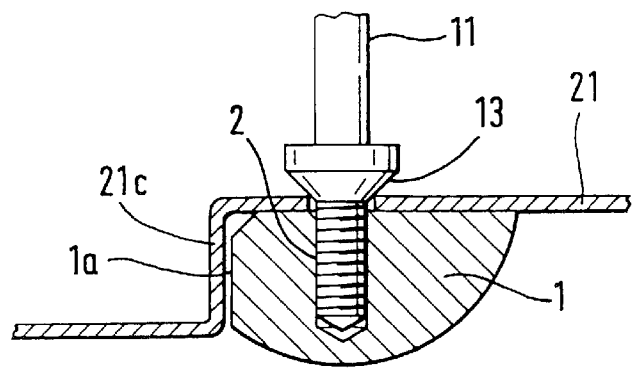
FIG. 3 is a lateral sectional view of another preferred embodiment of the mountable element or of the arrangement in the mounted position according to the invention.

FIG. 3 shows another preferred embodiment of the mountable element 1. According to this embodiment, the mountable element is constructed with a flattened area 1a, whereby the internal thread 2 is arranged asymmetrically with respect to the mountable element 1. By means of such a further development, it is possible to also measure holes in the vicinity of edge areas 21c of a component 21. It should be noted that, according to the embodiment of FIG. 3, the mountable element 1 is constructed without a supporting ring. It is also possible to construct the embodiment of FIG. 3 with bevels or supporting rings (not shown here), as illustrated, for example, in FIG. 1. The fixing screw 11 interacting with the mountable element 1 is shown only partially. The flattened area can be produced, for example, by means of milling-off the mountable element 1.

Figure 4:
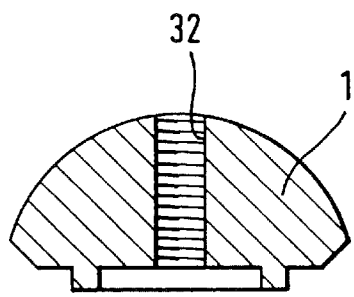
FIG. 4 is a lateral sectional view of another preferred embodiment of the mountable element according to the invention.

The mountable element illustrated in FIG. 4 has an internal thread constructed as a through-thread 32. By means of such an internal thread, it is possible to measure bolts and fixing screw thread sections of any length.

Figure 5:
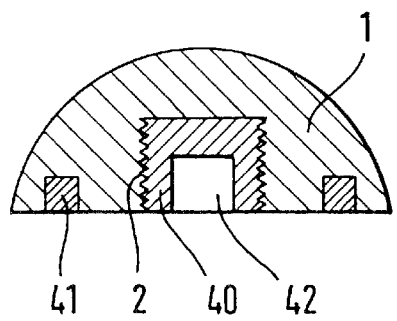
FIG. 5 is a lateral sectional view of a preferred embodiment of an arrangement according to the invention for measuring or determining the position of a bolt.

FIG. 5 shows a preferred embodiment of an arrangement according to the invention for measuring, or determining the position of, a bolt, particularly a welded bolt. Also in this case, the mountable element 1 is constructed with an internal thread 2. A fixing bush 40 constructed with an external thread can be screwed into the internal thread 2. The fixing bush 40 has a recess 42 whose shape is adapted to a bolt (not shown) to be measured. The fixing bush 40 may also be constructed with a through-recess and can interact, for example, with a through-hole of the mountable element, as illustrated in FIG. 4. For ensuring a good tight fit on the bolt, the mountable element 1 has a magnetic insert 41 constructed as a magnetic ring. By a corresponding exchange of the fixing bushes 40, an adaptation to different bolt diameters and bolt shapes is possible in a simple manner. By means of a slot (not shown) in the fixing bush 40, for example, by using a screwdriver, an exchange of the fixing bush can be carried out in a simple manner. The arrangement according to FIG. 5 can be slid onto smooth bolts (welded bolts) as well as threaded bolts. The illustrated arrangement can also be constructed by means of support rings, bevels or knurls (not shown).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mountable centering element for measuring, or determining a position of, a hole or bolt constructed on a component, which mountable element is placed on a first side of the component on a component surface surrounding the hole or the bolt, wherein the mountable centering element has an internal thread adapted to screw together with a fixing screw, which fixing screw is introduceable into the hole from a second side of the component for fixing the mountable element on the component while clamping the component between the mountable element and the fixing screw, or said internal thread being adapted to screw together with the bolt or a fixing bush adapted to an outer diameter of the bolt, and wherein the mountable element comprises at least a partially spherical outer contour, and a supporting ring arranged on an underside surface having an underside surface area, the supporting ring contacting the first side of the component over a contact area substantially less than the underside surface area of the mountable element; whereby the mountable element is mountable closely to the first side of the component in the presence of an uneven surface.

2. The mountable element according to claim 1, wherein said mountable element comprises a bevel on a lower edge.

3. The mountable element according to claim 1, wherein said internal thread is arranged asymmetrically with respect to the mountable element.

4. The mountable element according to claim 1, wherein said internal thread extends through said mountable element.

5. The mountable element according to claim 1, further comprising a magnetic insert arranged in the mountable element.

6. The mountable element according to claim 5, wherein said magnetic insert is a ring-shaped insert.

7. An arrangement for measuring, or determining a position of, a hole having a hole diameter in a vehicle body component, the arrangement comprising:

a mountable centering element having at least a partially spherical outer contour, and an internal thread, said mountable element being placeable on a first side of the vehicle body component on a component surface surrounding the hole;

a fixing screw interacting with the internal thread of the mountable element, said fixing screw being insertable into the hole from a second, opposite, side of the component to fix the mountable element on the component while clamping the component between the mountable element and the fixing screw, said fixing screw screwing into the internal thread of the mountable element;

wherein said fixing screw has a screw diameter less than the hole diameter so as to be inserted into the hole with play, and wherein said fixing screw comprises a conically tapered section adapted to engage with an opening of the hole so as to center the fixing screw in the hole.

8. The arrangement according to claim 7, wherein said mountable element further comprises a support ring provided on an underside surface thereof, said surface facing the first side of the component, wherein the support ring contacts the first side over a contact area substantially less than an area of the underside surface of the mountable element.

9. The arrangement according to claim 7, wherein said mountable element has a bevel on a lower edge.

10. The arrangement according to claim 7, wherein said internal thread is arranged asymmetrically in the mountable element.

11. The arrangement according to claim 7, wherein said internal thread extends through said mountable element.

12. The arrangement according to claim 7, wherein said mountable element comprises a magnetic insert to magnetically adhere the mountable element on the component.

13. An arrangement for measuring, or determining a position of, a bolt on a vehicle body part component, the arrangement comprising:

a mountable centering element having an internal thread;

a fixing bush having a recess corresponding to a shape or diameter of the bolt, said fixing bush having an external thread which screws into the internal thread of the mountable element, wherein the mountable element comprises a support ring arranged on an underside surface having an underside surface area, the support ring contacting a first side of the component over a contact area substantially less than the underside surface area of the mountable element;

whereby the mountable element is mountable closely to the first side of the component in the presence of an uneven surface.

14. The arrangement according to claim 13, wherein said mountable element has a substantially hemispherical outer contour.

15. The arrangement according to claim 13, wherein said mountable element has a bevel on a lower edge.

16. The arrangement according to claim 13, wherein said internal thread is arranged asymmetrically in the mountable element.

17. The arrangement according to claim 13, wherein said internal thread extends through said mountable element.

18. The arrangement according to claim 13, wherein said mountable element comprises a magnetic insert to magnetically adhere the mountable element on the component.

* * * * *